June 22, 1954     M. M. BORDEN     2,681,575
DIFFERENTIAL PRESSURE RESPONSIVE APPARATUS
Filed Sept. 15, 1950     3 Sheets-Sheet 1
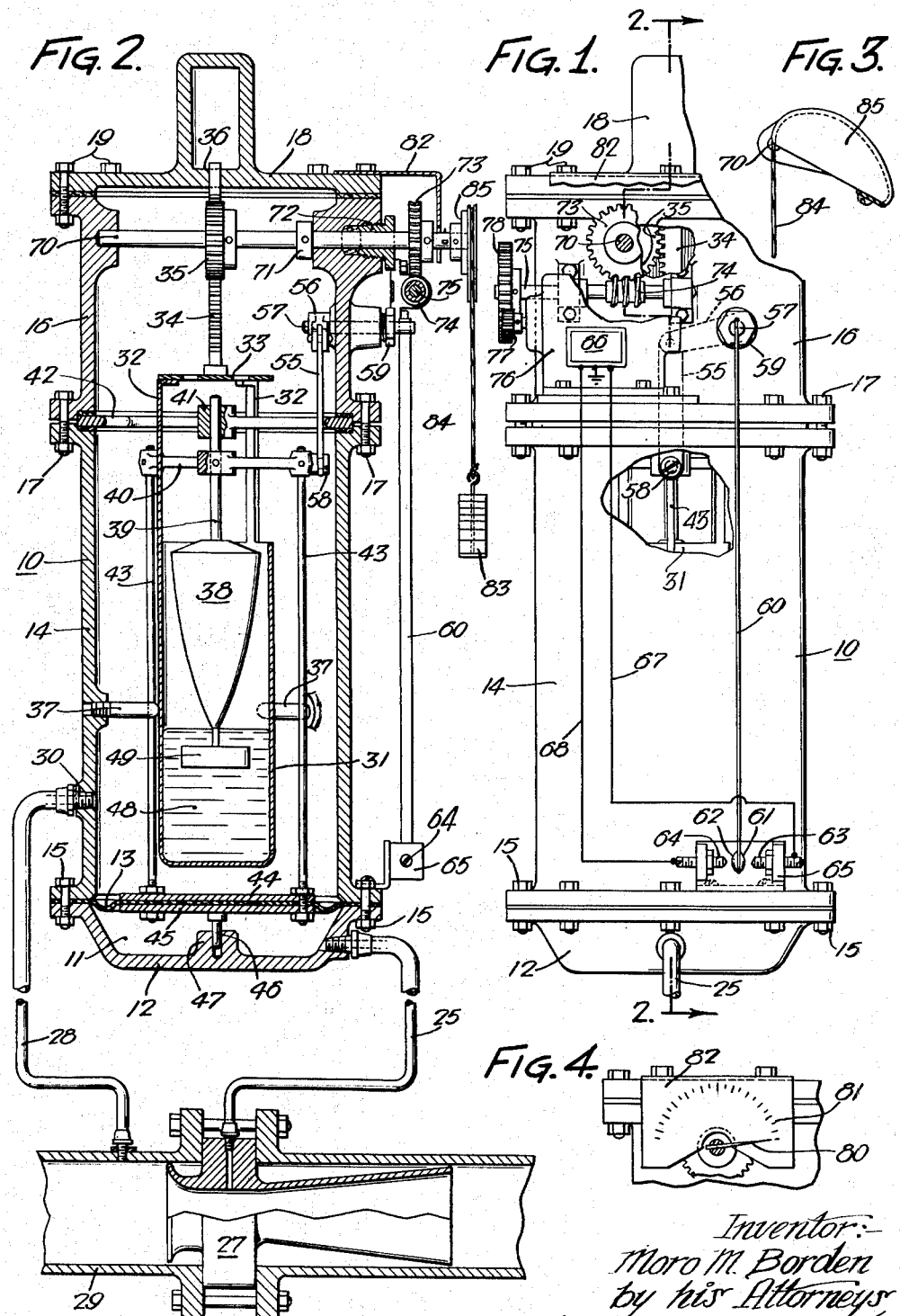
Inventor:-
Moro M. Borden
by his Attorneys
Howson & Howson

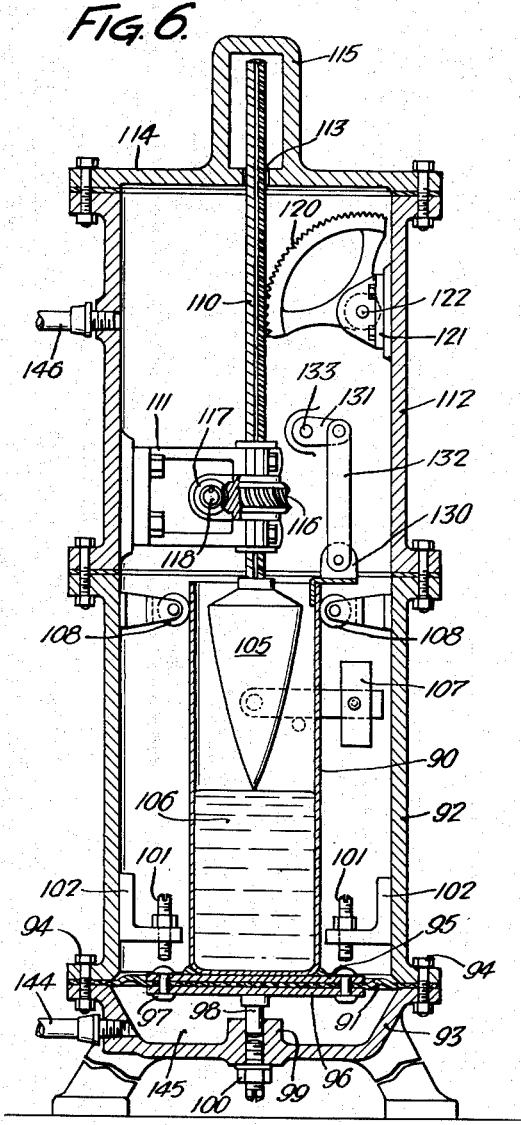
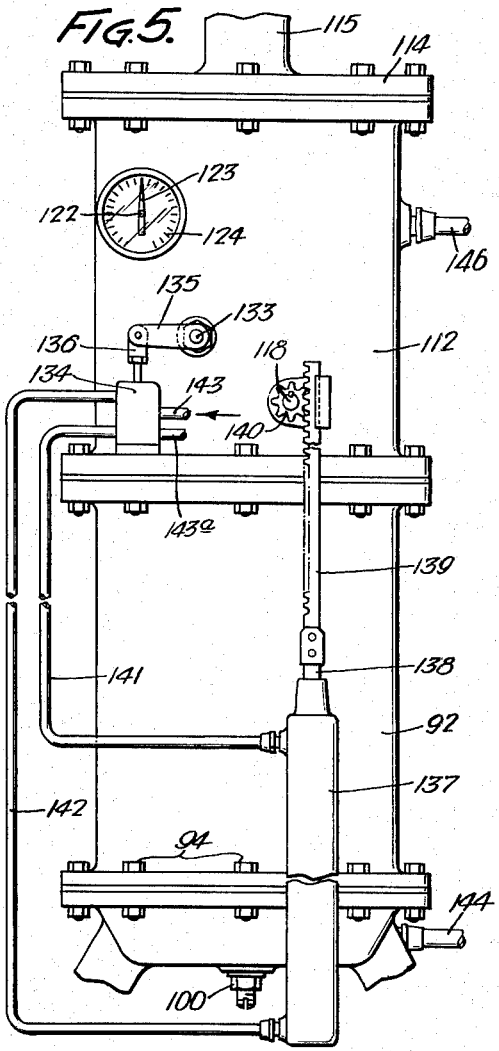
FIG. 6.
FIG. 5.

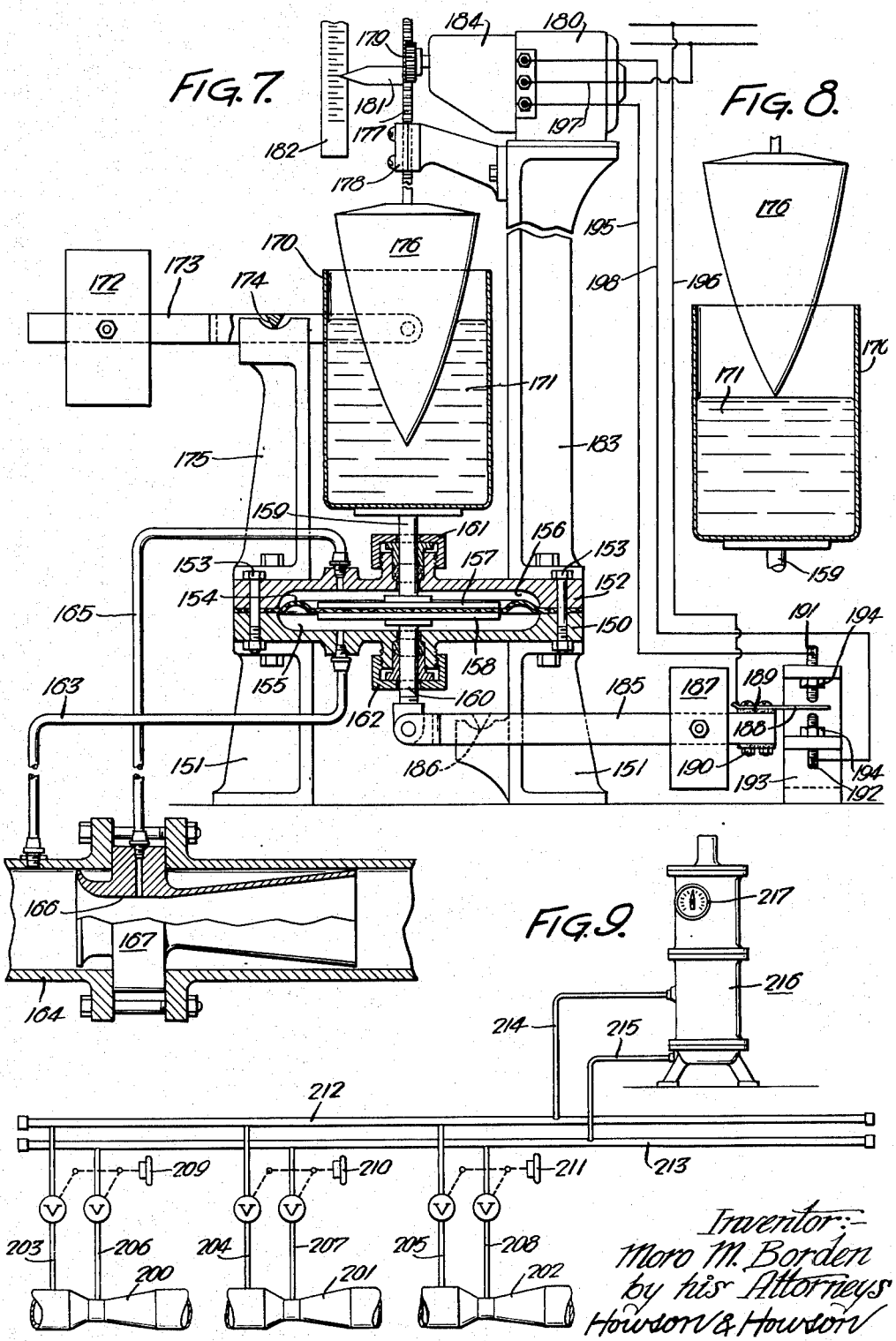

Patented June 22, 1954

2,681,575

UNITED STATES PATENT OFFICE 2,681,575

DIFFERENTIAL PRESSURE RESPONSIVE APPARATUS

Moro M. Borden, Collingswood, N. J., assignor to Simplex Valve & Meter Co., Philadelphia, Pa., a corporation of Delaware Application September 15, 1950, Serial No. 185,025

15 Claims. (Cl. 73—407)

This invention relates to flowmeters and more particularly to a device for measuring and indicating relatively small differential pressures in a fluid flow conduit.

When measuring the rate of flow in conduits carrying large amounts of impurities such as sewage and industrial waste liquids, it has been found necessary to service the flow measuring devices quite frequently to avoid inaccuracies due to stoppage and clogging. In particular, the fluid connections or conduits from the primary measuring device to the flowmeter, must be flushed at frequent intervals to prevent clogging. Furthermore, the construction of prior art meter assemblies has been such that the length of the connections between the meter and the primary device or venturi has been definitely limited due to the effects of friction and inertia involved in the transfer of the liquid through the pipes leading to the flow measuring instrument.

The present invention relates to a flowmeter having substantially greater accuracy and freedom from such effects, and which may be located much farther from the primary measuring device without the necessity for frequent cleaning or servicing.

I have found that if the transfer of fluid through the connections and consequently the amount of fluid in the measuring device itself, is reduced to a minimum, the above-noted objections may be substantially reduced or eliminated completely. However, if the fluid transfer is so reduced, the sensitivity of the measuring device itself will be proportionately increased. My improved instrument enables rapid sequential indications to be made from a series of remotely located venturis and also enables extremely rapid readings to be taken. The meter described herein also incorporates a shaped displacing element so shaped as to produce instrument readings proportional to the square root of the differential pressures delivered to it and in even spaced relation to the flow rate.

A primary object of the invention therefore, is to provide a differential pressure meter capable of accurately indicating relatively small differential pressure changes with more prompt and accurate response to them at increased distance from the primary differential pressure producing means.

A further object of the invention is to provide in a differential pressure meter a counterbalanced member which is actuated by relatively small changes in a predetermined differential pressure.

A further object of the invention is to provide in a differential pressure flowmeter an enclosed housing having two compartments separated by a movable wall or diaphragm, and in one of which compartments a shaped displacement member is movable.

A further object of the invention is to provide in a differential pressure flowmeter a housing having two compartments separated by a movable wall or diaphragm, and means associated with the diaphragm for actuating a shaped displacement member externally of the housing.

A further object of the invention is to provide suitable means for counterbalancing the various movable parts in a highly sensitive pressure differential flowmeter.

A still further object of the invention is to provide a flowmeter capable of using relatively small connecting conduits having negligible fluid flow therethrough.

A still further object of the invention is to provide a flowmeter capable of obtaining accurate readings from relatively small orifices in the primary device.

Further objects will be apparent from the specification and drawings, in which:

Fig. 1 is a side view of an improved differential pressure flowmeter constructed in accordance with the present invention;

Fig. 2 is a longitudinal section of the structure of Fig. 1, as seen at 2—2 of Fig. 1;

Fig. 3 is a detail of the variable moment lever for the counterweight;

Fig. 4 is a fragmentary detail of the indicator used with the flowmeter of Fig. 1;

Fig. 5 is a side view of a modified form of flowmeter;

Fig. 6 is a longitudinal section of the structure of Fig. 5;

Fig. 7 is a longitudinal section of a modified flowmeter having an external differential pressure-responsive mechanism;

Fig. 8 shows a part of the structure of Fig. 7 in the moved position; and

Fig. 9 is a schematic layout showing the utilization of my improved flowmeter for obtaining a series of rapid flow measurements.

The present invention is characterized by a housing having a movable wall or diaphragm positioned for relatively minor displacement. The housing is separated into two compartments so that the high pressure conduit from the fluid source to be measured is connected to one side of the diaphragm, whereas the low pressure conduit from the primary measuring device or venturi is connected to the opposite side of the diaphragm. Movement of the diaphragm actuates mechanism to control the displacement of a shaped float or member in a liquid such as mercury or oil. When the weight of the liquid displaced by the float is sufficient to balance the displacing pressure on the diaphragm, the actuating mechanism is stopped, and a suitable indicator is employed to indicate the result of an applied differential pressure in terms of the rate of flow. In one form of the invention, the liquid displacing apparatus is contained within the housing of the flowmeter, whereas in another form, this structure is external to the housing.

Referring now more particularly to the drawings, the flowmeter illustrated in Figs. 1 and 2 comprises a housing 10 having a lower compartment 11 formed between housing base 12 and flexible diaphragm or separator 13. Base 12 is bolted to the middle housing section 14 by means of bolts 15, 15 and the upper housing 16 is secured to the middle housing 14 by means of bolts 17, 17. A cap 18 is secured in fluid-tight relationship to upper housing 16 by means of bolts 19, 19. The low pressure conduit 25 from the throat of a primary measuring device such as venturi 27, is connected to the low pressure compartment 11. The high pressure conduit 28 from fluid pipe 29 is connected to housing 14 at 30 and provides fluid communication to the opposite side of diaphragm 13.

Housing 14 contains a chamber or vessel 31 which is suspended by arms 32, 32 and plate 33, from a rack 34. Vessel 31 is moved in a vertical direction by means of a pinion 35 which cooperates with rack 34, and the upper end of the rack is guided at 36 in cap 18. A plurality of radial abutments 37, 37 in the walls of middle section 14 of the housing, serve to guide and retain the vessel 31, as shown in Fig. 2.

A liquid displacing element or float 38 is suspended from rod 39 which is anchored in a spider 40. Rod 39 extends above spider 40 and is axially journaled in the hub 41 of a spider 42 securely clamped between the upper section 16 and the middle section 14. Spider 40 as well as the float 38, are supported by the diaphragm 13 through columns 43, 43 which are clamped to the diaphragm through plates 44 and 45. Lower plate 45 is provided with a centering guide 46 positioned to ride vertically in drilled boss 47 on the inside of base 12. Float 38 somewhat resembles an inverted cone, but the contour of the face of the float is so shaped that the movement of vessel 31 necessary to produce a balance of differential head on diaphragm 13, with respect to the weight of liquid displaced by float 38 in vessel 31 is proportional to the square root of such differential head and of the displacement pressure and consequently proportioned to the flow. Float 38 is also provided with a secondary displacing member 49 which remains immersed in the liquid 48. The weight of liquid displaced by member 49 equals the weight in water of the floating structure, namely the weight of the float, the float rod 39, spider 40, columns 43, diaphragm plates 44, 45 and the diaphragm 13. This insures that no displacement of liquid by the shaped portion of float 38 is necessary to counterbalance the weight of the supporting structure.

In the normal at-rest position shown in Fig. 2, the shaped portion of float 38 is substantially out of the liquid 48 and this condition is stable so long as there is no difference in pressure on either side of diaphragm 13. However, let it be assumed that this pressure differential changes so that the pressure in compartment 11 is decreased. This causes diaphragm 13 and its supporting structure to drop slightly, thus immersing the float partially in liquid 48. Any variation in the position of spider 40, is transmitted through a link 55 connected to lever arm 56 on shaft 57 at one end, and to the spider 40 by screw 58 at the other end. Shaft 57 extends through upper housing 16 and is provided with a suitable packing nut 59. The outboard end of shaft 57 carries an elongated downwardly depending flexible arm 60 which carries electrical contacts 61 and 62 on either side at the lower end thereof. Contacts 61 and 62 cooperate with adjustable stationary contacts 63 and 64 mounted in a bracket 65, as shown in Fig. 1. The length of arm 60 is such that considerable amplification of any movement of spider 40 is provided at contacts 61—64. Contacts 63 and 64 are connected to junction box 66 through leads 67 and 68 respectively, as shown in Fig. 1.

Pinion 35 is secured to shaft 70 which is journaled horizontally in upper housing 16 and axially retained therein by means of a collar 71. Shaft 70 extends through the housing and is provided with a stuffing box and gland nut 72. The outboard end of shaft 70 carries a worm wheel 73 which meshes with a worm gear 74 on shaft 75. A reversible electric motor 76 is secured to upper housing 16 and drives shaft 75 through spur gears 77 and 78.

When spider 40 and its associated structure moves in housing 14, arm 60 swings so that a circuit is closed between either contacts 61 and 63, or contacts 62 and 64. If the diaphragm 13 and spider 40 are raised, then contacts 62 and 64 close to start motor 76, which action raises vessel 31 through shafts 75, 70 and rack 34 until equilibrium is restored through the displacing effect of the mercury in the vessel 31.

The amount of movement of shaft 70 required to equalize the variation in differential pressure described above, is indicated by a pointer 80 mounted on shaft 70 and cooperating with scale 81 on bracket 82.

In order to utilize the smallest possible motor 76 and to increase sensitivity, I provide a counterweight 83 which is suspended by a cord 84 from arcuate lever arm 85 mounted on shaft 70. In the neutral position of Fig. 3, the centerline of cord 84 coincides with the centerline of shaft 70 so that there is no torque transmitted to the shaft due to weight 83. When shaft 70 rotates however, lever arm 85 turns counterclockwise (as seen in Fig. 3) to provide a variable and increasing moment arm for weight 83 in order to compensate for the variable buoyant reaction of the liquid. This construction materially reduces the starting torque required for motor 76, thus minimizing lag and reducing the current required as well as the size of the motor.

Referring now more particularly to Figs. 5 and 6, a somewhat modified form of flowmeter is illustrated therein. In this embodiment, the liquid vessel 90 is supported directly on diaphragm or separator 91 which is secured between the lower housing 92 and base 93 by means of bolts 94, 94. Plates 95 and 96 are riveted to diaphragm 91 at 97, 97, and the lower plate 96 is provided with a guide 98 which is vertically slidable in drilled box 99 in base 93. An adjustable stop 100 in boss 99 enables the maximum downward displacement of diaphragm 91 to be controlled, whereas adjustable stops 101, 101 on brackets 102, 102 permit the maximum upward displacement of diaphragm 91 to be controlled.

The shaped float 105 is suspended within the upper part of vessel 90 and in the "no flow" position is entirely above the level of liquid 106 in the vessel. An adjustable counterweight 107 for the vessel and the liquid is also enclosed within housing 92, and rollers 108, 108 supported from the inner walls of housing 92 guide the vertical movement of vessel 90. Float 105 is suspended from and attached to a slotted rack 110 which is non-rotatably supported in a bracket 111 secured to the inner wall of upper housing 112. The top of rack 110 extends through an aperture 113 in cap 114 and is enclosed within a hollow boss 115 formed integrally with the cap. A worm wheel 116 is journaled in bracket 111 and interior threads on the wheel mesh with rack 110 so that rotation of worm wheel 116 reciprocates the rack and float vertically up and down in the housing. Worm 117 on shaft 118 meshes with wheel 116 interiorly of housing 112, and shaft 118 is journaled in, and extends through housing 112 as shown in Fig. 5. A toothed sector 120 is journaled on bracket 121 inside housing 112 in such a way that vertical movement of rack 110 rotates a shaft 122 extending through housing 112, as also shown in Fig. 5. A suitable pointer 123 is secured to shaft 122 so that movement of rack 110 may be read on flow scale 124.

The top of vessel 90 is provided with a bracket 130 which is operatively connected to a lever arm 131 through link 132. Lever arm 131 is secured to a shaft 133 extending through housing 112 so that any vertical movement of vessel 90 is transmitted to a fluid valve 134 through link 132 as well as lever 135 and rod 136 on the outside of the housing. In the meter shown in Figs. 5 and 6, the change in differential pressure is transmitted to a fluid cylinder 137, the piston of which is connected to a rod 138. A rack 139 is connected to piston rod 138 so that movement of the rack under actuation of cylinder 137 turns shaft 118 through pinion 140. Each end of cylinder 137 is connected to valve 134 by means of fluid conduits 141 and 142 so that upon actuation of valve 134, fluid pressure entering the valve from a suitable source, through conduit 143, may be selectively introduced to cylinder 137 to rotate shaft 118 in accordance with the direction in which valve 134 has been moved. Conduit 143a provides the necessary vent or discharge for expelled fluid.

It will be understood that the flowmeter of Figs. 5 and 6 is connected to a primary measuring device such as shown in Fig. 2, through the high pressure conduit 144 which communicates with chamber 145 in base 93. The low pressure connection to the primary device is through conduit 146 which communicates with the interior of housings 92 and 112. For this reason, the diaphragm 91 is reversed from the diaphragm 13 of Fig. 2.

In operation, assume that a change in the differential pressure between chamber 145 and housing 92 causes vessel 90 to be raised. This in turn actuates valve 134 through link 132 and its associated connections. Upward movement of vessel 90 permits fluid under pressure to be introduced into and delivered from conduits 142 and 141, thus raising rack 139 and turning shaft 118 in a clockwise direction as seen in Fig. 6. This in turn lowers float 105 into liquid 106 until the weight of the displaced liquid equalizes the increment of increased pressure, at which time the vessel returns to its initial position and valve 134 is closed. In the event that pressure in chamber 145 is now decreased, the reverse operation takes place by suitable introduction of fluid into conduit 141 and discharged from conduit 142 until equilibrium is reached. Any movement of rack 110 may then be observed due to the change in position of pointer 123.

Fig. 7 shows a further modification of my improved flowmeter in which the displacement mechanism is completely outside the differential pressure housing. In this case, the lower housing 150 is supported on legs 151, 151 and is bolted to upper housing 152 by means of bolts 153, 153. The diaphragm or separator 154 is tightly secured between the upper and lower housings and separates the high pressure chamber 155 in housing 150 and the low pressure chamber 156 in housing 152. Movement of diaphragm 154 is transmitted through the upper and lower plates 157 and 158 respectively, to the upper shaft 159 connected to plate 157 and the lower shaft 160 connected to plate 158. Each shaft 159 and 160 is provided with a suitable stuffing box assembly designated generally by the numerals 161 and 162 respectively.

Fluid communication with chamber 155 is provided through conduit 163 to the main pipe 164. Similarly, conduit 165 provides fluid communication between upper chamber 156 and the throat 166 of the Venturri assembly 167 in a manner similar to that shown in conjunction with Fig. 6. A vessel 170 is supported on upper shaft 159 and is filled with a suitable liquid 171 such as mercury or oil. The mass of the vessel 170 as well as the liquid and shaft, is counterbalanced by means of weight 172 adjustably supported on arm 173 fulcrumed at 174 on standard 175. The position of weight 172 is adjusted on lever 173 so that the system is balanced when the shaped float 176 is just touching the surface of liquid 171, as shown in Fig. 8. Float 176 is suspended from a rack 177 vertically slidable in bracket 178 and in mesh with a pinion 179 driven by an electric motor 180. Rack 177 also carries a suitable pointer 181 which cooperates with a scale 182 to indicate the amount of movement of rack 177 and of the flow rate. Motor 180 is mounted on standard 183 and may be provided with a suitable reduction gear box 184 if desired.

Shaft 160 extends through the lower stuffing box 162 and is pivotally connected to a lever 185 fulcrumed at 186. Lever 185 is likewise provided with a counterweight 187 which is so adjusted that it balances the weight of the mechanism associated with shaft 160. The outer end of lever 185 is provided with an insulated contact element 188 secured thereto through suitable insulating material 189 and screws 190. Element 188 reciprocates between adjustable contacts 191 and 192 mounted in bracket 193 and secured therein by means of lock nuts 194, 194. When the element 188 is raised, a circuit is completed through leads 195, 196 and 197 to motor 180, to turn the motor in a direction to raise rack 177 and float 176 until the weight of the displaced liquid 171 equals the differential pressure in chambers 155 and 156, at which time the circuit is opened at contact 191. In the event the pressure in chamber 155 is increased, vessel 170 is raised, which in turn lowers element 188 until the circuit is closed through leads 196, 198 and 197. This reverses motor 180 and lowers float 176 until stable conditions prevail, at which time the circuit is likewise opened by element 188.

The design of my improved flowmeter reduces the change of volume of liquid in the meter housing and the connections to a minimum. This eliminates the necessity for frequent flushing and enables the meter to be used at a considerable distance from the primary measuring device. The construction is extremely accurate and simple to manufacture. Where it is important that the volume of liquid that provides the differential pressure be kept to an absolute minimum, the structure of Fig. 7 will be employed. However, the advantage of the constructions shown in Figs. 2 and 6 is that they avoid any errors that might be introduced due to the presence of stuffing boxes for the diaphragm shafts.

Fig. 9 illustrates the manner in which my improved flowmeter construction can be used to give very rapid sequential readings from a plurality of primary measuring devices. In this case, the primary devices 200, 201 and 202 are provided with high pressure fluid conduits 203, 204 and 205 respectively, as well as low pressure conduits 206, 207 and 208. Each pair of conduits from a primary device has dual valves which may be controlled simultaneously by valve wheels 209, 210 and 211. Each of the high pressure conduits 203, 204 and 205 communicate with a high pressure header 212 and each of the low pressure conduits 206, 207 and 208 communicate with a low pressure header 213. Taps 214 and 215 connect the high and low pressure headers respectively to the flowmeter assembly 216.

When it is desired to take rapid flow readings from primary devices 200, 201 and 202, it is only necessary to open any one of the normally closed valves 209, 210 and 211 to obtain an instantaneous reading on gauge 217. Heretofore it has been impossible to obtain such rapid readings with a single meter placed at a distance from the primary device.

It will be noted that in all of the various forms shown and described hereinbefore, the diaphragm has very limited movement which under normal operating conditions is on the order of a few thousandths of an inch. Further there is no transfer of liquid in the upper chamber of Figures 2 and 6 resulting from the movement of either vessel 31 or of the float 105 since the volumes of mercury, the water and the displacer remain the same. This means that the pressure-responsive element connected to the diaphragm (either the float or the vessel) likewise has limited movement, whereas the other compensating element that cooperates with the diaphragm actuated device must have a sufficiently wide range of adjustment to provide for all normal pressure variations due to change of flow rates.

It is desirable in all cases that a shaped float be used so that direct readings can be obtained, and it will be apparent that suitable recording instruments may be substituted for the indicating pointers if desired. The contour of the float is such a function of the displacing pressure that the compensating movements of the float or the vessel, are directly proportional to the square root of the differential pressures and so to the flow rate.

It will be understood that the sensitivity of the present flowmeter renders it equally effective for use in measuring any fluid flow, whether liquid or gas. However, when the flowmeter is used to measure change in flow in sewage lines or the like, the body of the meter (including both of the chambers) will be filled with a relatively pure, clean liquid which will not circulate through the small conduits, thereby avoiding introduction of foreign matter into the conduits or chambers.

Having thus described my invention, I claim:

1. In an apparatus responsive to difference of two pressures, means movably responsive to differential pressure, means for applying to said first means the two pressures whose difference is to effect response of the apparatus, a first member movable by said pressure-responsive means, a second member movably supported in cooperative relation with said first member, one of said members being a liquid container and the other member being a liquid-displacement member disposed in said container and shaped according to a function of differential pressure to produce a balancing reacting force through relative movement of the two members, means operable by movement of said pressure-responsive means for moving said second member in a direction to effect return movement of said first member and said pressure-responsive means through liquid displacement counterbalancing the differential pressure on said pressure-responsive means, and means operable according to the movement of said second member to effect a desired function.

2. In an apparatus responsive to difference of two pressures, a diaphragm mounted horizontally to move vertically in response to the difference of two pressures applied to its upper and lower surfaces, means for applying to said surfaces the two pressures whose difference is to effect response of the apparatus, a first member connected to said diaphragm for vertical movement thereby, a second member mounted for vertical movement in cooperative relation with said first member, one of said members being a liquid container and the other member being a liquid-displacement member to produce reacting force by relative movement of the two members, means operable by movement of said diaphragm for moving said second member in a direction to effect return movement of said first member and said diaphragm through liquid displacement counterbalancing the differential pressure on said diaphragm, and means operable according to the movement of said second member to effect a desired function.

3. Apparatus according to claim 2, wherein the means operable by movement of said diaphragm includes a reversible electric motor for moving said second member, and switch means operable by movement of said diaphragm to control operation of said motor.

4. Apparatus according to claim 2, wherein the means operable by movement of said diaphragm includes means operable by pressurized fluid to move said second member, and valve means operable by movement of said diaphragm to control the pressurized fluid-operable means.

5. In an apparatus responsive to difference of two pressures, a diaphragm mounted horizontally to move vertically in response to the difference of two pressures applied to its upper and lower surfaces, means for applying to said surfaces the two pressures whose difference is to effect response of the apparatus, a liquid container mounted for vertical movement, a liquid-displacement member connected to said diaphragm and movable vertically thereby in the liquid of said container, means operable by movement of said diaphragm for moving said container in a direction to effect return movement of said displacement member and said diaphragm through liquid displacement counterbalancing the differential pressure on said diaphragm, and means operable according to the movement of said container to effect a desired function.

6. Apparatus according to claim 5, wherein said liquid-displacement member is mounted on said diaphragm and is always partially submerged in said liquid to counterbalance the weight of said member and its mounting.

7. Apparatus according to claim 5, wherein the means operable by movement of said diaphragm includes a reversible electric motor for moving said container, and switch means operable by movement of said diaphragm to control operation of said motor.

8. In an apparatus responsive to difference of two pressures, a diaphragm mounted horizontally to move vertically in response to the difference of two pressures applied to its upper and lower surfaces, means for applying to said surfaces the two pressures whose difference is to effect response of the apparatus, a liquid container mounted on said diaphragm for vertical movement thereby, a liquid-displacement member mounted for vertical movement in the liquid of said container, means operable by movement of said diaphragm for moving said displacement member in a direction to effect return movement of said container and said diaphragm through liquid displacement counterbalancing the differential pressure on said diaphragm, and means operable according to the movement of said displacement member to effect a desired function.

9. Apparatus according to claim 8, including means counterbalancing the weight of said container and the liquid therein.

10. Apparatus according to claim 8, wherein the means operable by movement of said diaphragm includes means operable by pressurized fluid to move said displacement member, and valve means operable by movement of said diaphragm to control the pressurized fluid-operable means.

11. Apparatus according to claim 8, wherein the means operable by movement of said diaphragm includes a reversible electric motor for moving said displacement member, and switch means operable by movement of said diaphragm to control operation of said motor.

12. In an apparatus responsive to difference of two pressures, an elongate vertical housing, a diaphragm mounted horizontally in the lower part of said housing to move vertically in response to the difference of two pressures applied to its upper and lower surfaces, means for applying to said surfaces the two pressures whose difference is to effect response of the apparatus, a first member within said housing mounted on said diaphragm for vertical movement thereby, a second member within said housing mounted for vertical movement in cooperative relation with said first member, one of said members being a liquid container and the other member being a liquid-displacement member to produce reacting force by relative movement of the two members, means operable by movement of said diaphragm for moving said second member in a direction to effect return movement of said first member and said diaphragm through liquid-displacement counterbalancing the differential pressure on said diaphragm, and means operable according to the movement of said second member to effect a desired function.

13. In an apparatus responsive to difference of two pressures, an elongate vertical housing, a diaphragm mounted horizontally in the lower part of said housing to move vertically in response to the difference of two pressures applied to its upper and lower surfaces, means for applying to said surfaces the two pressures whose difference is to effect response of the apparatus, a liquid container within said housing mounted for vertical movement, a liquid-displacement member within said housing mounted on said diaphragm for vertical movement thereby in the liquid of said container, means operable by movement of said diaphragm for moving said container in a direction to effect return movement of said displacement member and said diaphragm through liquid-displacement counterbalancing the differential pressure on said diaphragm, and means operable according to the movement of said container to effect a desired function.

14. In an apparatus responsive to difference of two pressures, an elongate vertical housing, a diaphragm mounted horizontally in the lower part of said housing to move vertically in response to the difference of two pressures applied to its upper and lower surfaces, means for applying to said surfaces the two pressures whose difference is to effect response of the apparatus, a liquid container within said housing mounted on said diaphragm for vertical movement thereby, a liquid-displacement member within said housing mounted for vertical movement in the liquid of said container, means operable by movement of said diaphragm for moving said displacement member in a direction to effect return movement of said container and said diaphragm through liquid-displacement counterbalancing the differential pressure on said diaphragm, and means operable according to the movement of said displacement member to effect a desired function.

15. In an apparatus responsive to difference of two pressures, a housing, a diaphragm mounted horizontally in said housing to move vertically in response to the difference of two pressures applied to its upper and lower surfaces, means for applying to said surfaces the two pressures whose difference is to effect response of the apparatus, support means extending upward from the upper surface of said diaphragm externally of said housing, a liquid container supported by said support means above said housing, whereby said container is movable vertically by said diaphragm, a liquid - displacement member mounted above said housing for vertical movement in the liquid of said container, means operable by movement of said diaphragm for moving said displacement member in a direction to effect return movement of said container through liquid-displacement counterbalancing the differential pressure on said diaphragm, and means operable according to the movement of said displacement member to effect a desired function.

References Cited in the file of this patent

UNITED STATES PATENTS

| Number | Name | Date |
| --- | --- | --- |
| 983,811 | Dolbey et al. | Feb. 7, 1911 |
| 1,043,115 | Ledoux | Nov. 5, 1912 |
| 1,614,217 | Thompson | Jan. 11, 1927 |
| 2,087,494 | Annin | July 20, 1937 |
| 2,354,423 | Rosenberger | July 25, 1944 |
| 2,363,174 | Green et al. | Nov. 21, 1944 |
| 2,371,253 | Moore | Mar. 13, 1945 |
| 2,380,177 | Hicks | July 10, 1945 |
| 2,447,349 | Lehde | Aug. 17, 1948 |

FOREIGN PATENTS

| Number | Country | Date |
| --- | --- | --- |
| 416,798 | Germany | July 29, 1925 |